United States Patent
Surridge

[19]

[11] Patent Number: 6,044,810
[45] Date of Patent: Apr. 4, 2000

[54] FAN ASSEMBLY INCLUDING A FAN GUARD HAVING A VOID WITH AN INTERIOR FILLER MATERIAL DISPOSED THEREIN

[75] Inventor: David G. Surridge, Knightdale, N.C.

[73] Assignee: Caterpillar Inc., Peoria, Ill.

[21] Appl. No.: 09/017,310

[22] Filed: Jan. 30, 1998

[51] Int. Cl.[7] ................ F24H 3/06; F01D 5/00
[52] U.S. Cl. ............. 123/41.49; 165/122; 165/136; 415/200; 415/214.1
[58] Field of Search .............. 123/41.49; 415/200, 415/214.1, 121.3, 223; 165/121, 122, 136; 264/572, 45.1, 45.5

[56] References Cited

U.S. PATENT DOCUMENTS

| | | | |
|---|---|---|---|
| 3,976,393 | 8/1976 | Larson | 415/119 |
| 3,980,132 | 9/1976 | Mitchell et al. | 165/76 |
| 4,182,596 | 1/1980 | Wellman | 415/207 |
| 4,437,394 | 3/1984 | Tateishi | 454/285 |
| 4,508,486 | 4/1985 | Tinker | 415/119 |
| 4,685,513 | 8/1987 | Longhouse et al. | 165/121 |
| 4,750,860 | 6/1988 | Kelley | 415/119 |
| 4,800,734 | 1/1989 | Sauber et al. | 62/263 |
| 5,024,267 | 6/1991 | Yamaguchi et al. | 165/122 |
| 5,040,943 | 8/1991 | Dwyer et al. | 415/26 |
| 5,046,554 | 9/1991 | Iwasaki et al. | 165/140 |
| 5,101,321 | 3/1992 | Remise et al. | 361/695 |
| 5,294,195 | 3/1994 | Amr et al. | 312/236 |
| 5,307,849 | 5/1994 | Nelson | 150/165 |
| 5,423,660 | 6/1995 | Sortor | 416/189 |
| 5,749,702 | 5/1998 | Datta et al. | 415/119 |
| 5,797,721 | 8/1998 | Yu | 415/5 |
| 5,850,872 | 12/1998 | Cesaromi | 165/41 |
| 5,875,836 | 3/1999 | Nakamura | 165/122 |

FOREIGN PATENT DOCUMENTS

| | | | |
|---|---|---|---|
| 0017546 | 3/1980 | European Pat. Off. | F04D 29/54 |
| 5-169490 | 7/1993 | Japan | B29C 45/14 |
| 7-269497 | 10/1995 | Japan | F04D 29/54 |
| 1349087 | 3/1974 | United Kingdom | F24H 3/06 |
| WO9424493 | 10/1994 | WIPO | F24F 13/00 |

OTHER PUBLICATIONS

WPI Abstract Accession No. 93–337655 [43] & DE4212704 A (Mercedes).

*Primary Examiner*—Noah P. Kamen
*Assistant Examiner*—Hai Huynh
*Attorney, Agent, or Firm*—Paul J. Maginot; Bradford G. Addison

[57] ABSTRACT

A fan assembly for a work machine includes a fan housing which has a fan guard and a fan shroud defined therein. The fan housing includes a rotationally molded, hollow exterior shell structure. The exterior shell structure is filled with a filler material so as to enhance the structural rigidity and stiffness of the fan housing. The fan assembly of the present invention utilizes fewer components relative to fan assemblies which have heretofore been designed thereby decreasing costs and assembly time associated with the work machine.

18 Claims, 4 Drawing Sheets

FAN ASSEMBLY INCLUDING A FAN GUARD HAVING A VOID WITH AN INTERIOR FILLER MATERIAL DISPOSED THEREIN

TECHNICAL FIELD OF THE INVENTION

The present invention relates generally to a fan assembly for a work machine, and more particularly to a fan assembly which includes a fan guard having a void therein with an interior filler material disposed therein.

BACKGROUND OF THE INVENTION

A work machine, such as a wheel loader, typically has a fan assembly associated therewith. The fan assembly includes a fan which generates a flow of air which is directed by components associated with the fan assembly into a radiator in order to cool a liquid, such as engine coolant, which is circulating through the radiator's heat exchanger core.

The fan assembly associated with the work machine typically includes a relatively large number of components. For example, the fan assembly includes the fan itself having a number of fan blades, a fan guard for preventing inadvertent contact with the fan blades during operation of the fan, and a fan shroud for directing a flow of air through the fan thereby preventing heated air from the engine from recirculating through the radiator. Moreover, the fan assembly may include a number of grille screens or panels for preventing debris or the like from contacting the rotating fan blades.

Such fan assemblies have a number of drawbacks associated therewith. For example, each of the above-mentioned components is typically configured as a individual, discrete component thereby disadvantageously increasing costs associated with the work machine. Moreover, use of individual, discrete components may disadvantageously increase assembly time associated with the work machine.

What is needed therefore is a fan assembly for a work machine which overcomes one or more of the above-mentioned drawbacks.

DISCLOSURE OF THE INVENTION

In accordance with a first embodiment of the present invention, there is provided a fan assembly which includes a fan housing defining a central passage. The fan housing being prepared by a process including the steps of (i) molding an exterior shell structure having a first void therein, and (ii) filling the first void of the exterior shell structure with an interior filler material after the exterior shell structure molding step. The fan assembly also includes a fan blade positioned in the central passage and a fan motor for rotating the fan blade.

In accordance with a second embodiment of the present invention, there is provided a fan assembly which includes a fan housing defining a central passage. The fan housing being prepared by a process which includes the steps of (i) molding the fan housing so as to possess (A) an exterior shell structure having a first void defined therein, (B) a handle having a second void defined therein, the handle being attached to the exterior shell structure, and (C) a shroud having a third void defined therein, the shroud being attached to the exterior shell structure, and (ii) filling the first void, the second void, and the third void with an interior filler material after the molding step. The fan assembly also includes a fan blade positioned in the central passage and a fan motor for rotating the fan blade.

In accordance with a third embodiment of the present invention, there is provided a fan assembly which includes a fan housing defining a central passage. The fan housing being prepared by a process which includes the steps of (i) molding the fan housing so as to possess (A) an exterior shell structure having a first void defined therein, (B) a handle having a second void defined therein, the handle being attached to the exterior shell structure, (C) a shroud having a third void defined therein, the shroud being attached to the exterior shell structure, (D) forming a latch recess in the exterior shell structure, (E) forming a hinge recess in the exterior shell structure, (F) forming a light mounting recess in the exterior shell structure, (G) forming a hydraulic line access opening in the exterior shell structure, and (ii) filling the first void, the second void, and the third void with an interior filler material after the molding step.

BEST MODE FOR CARRYING OUT THE INVENTION

Figure 1:
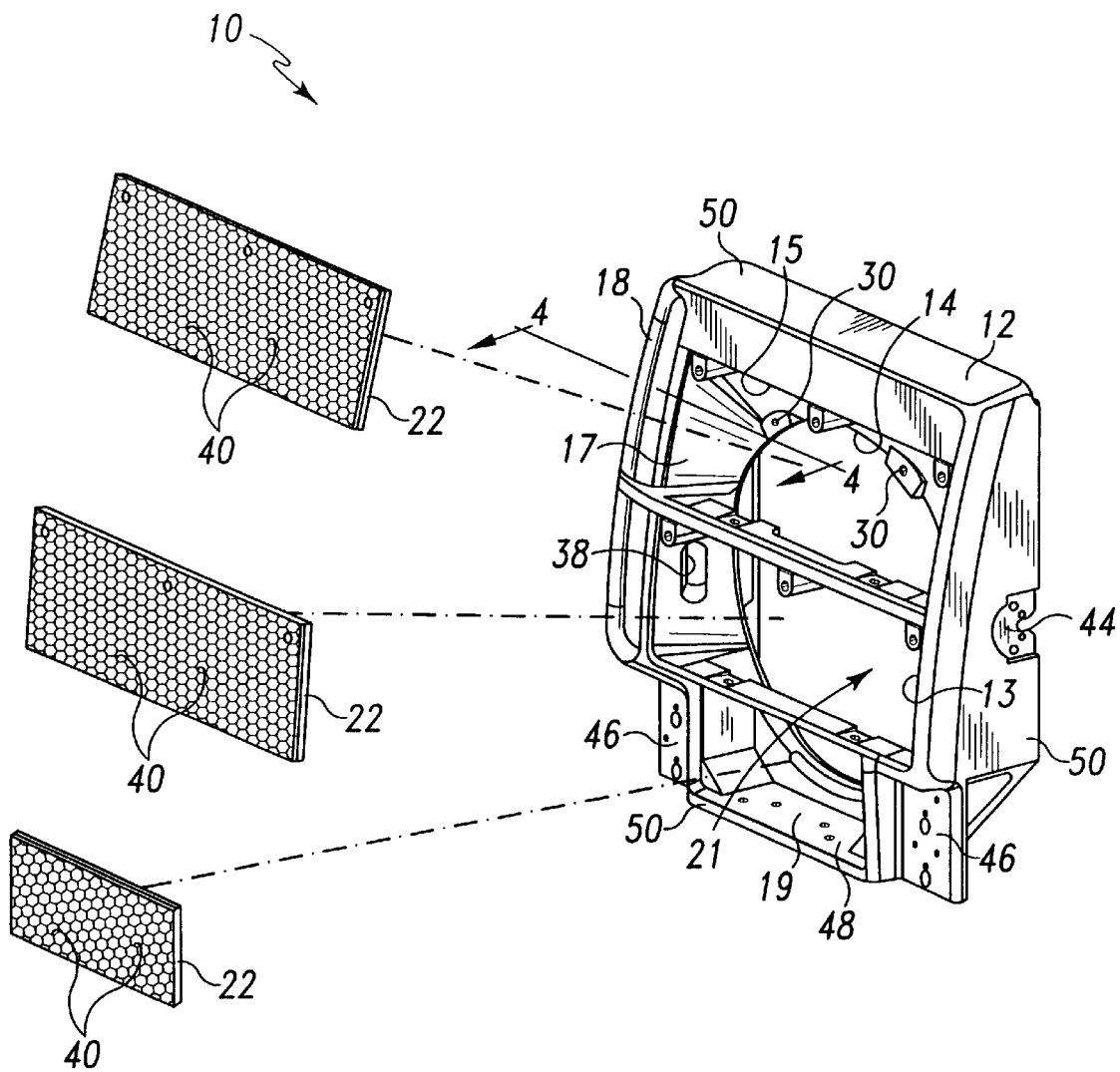
FIG. 1 is an exploded perspective view of a fan assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
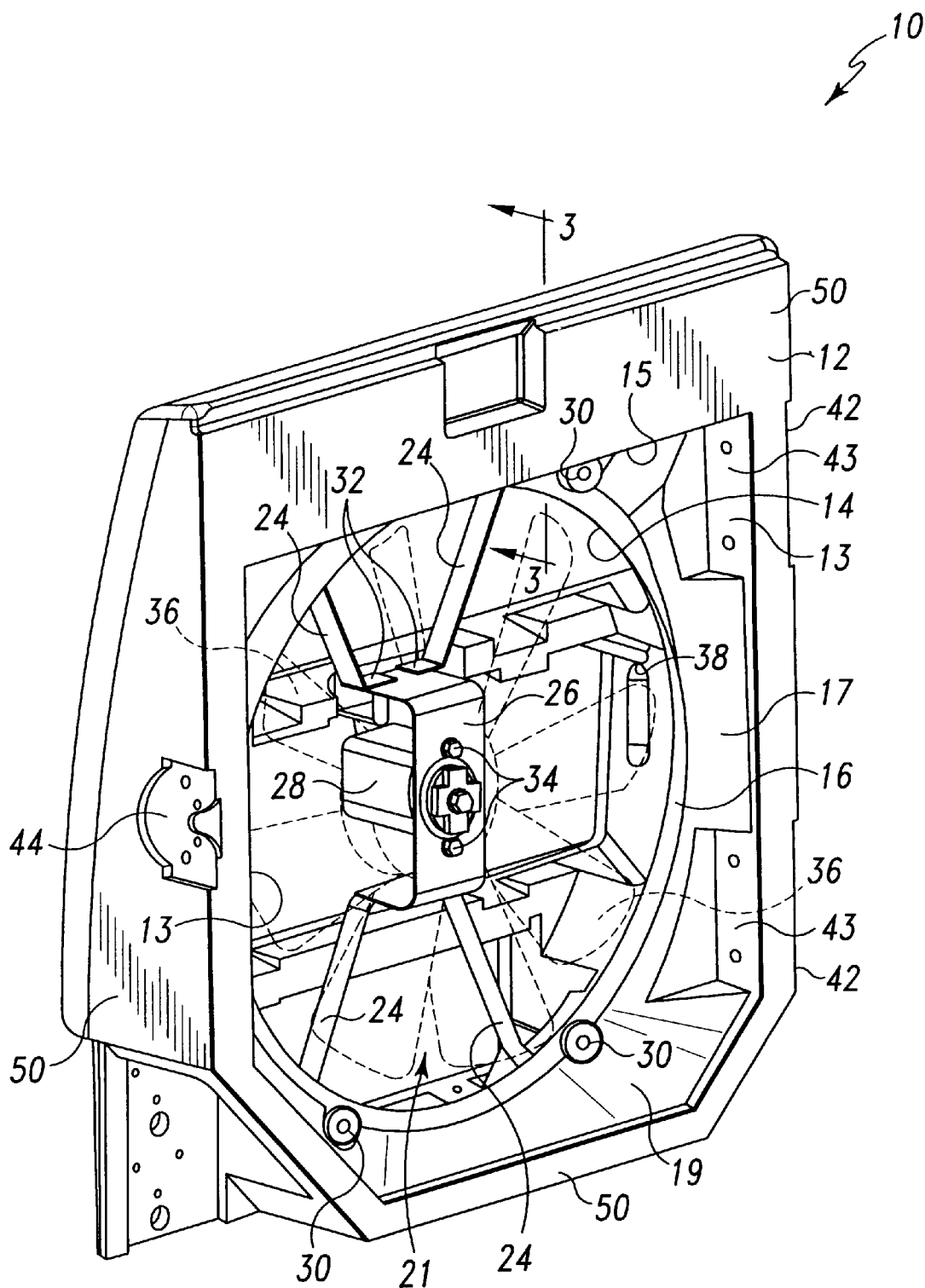
FIG. 2 is a rear perspective view of the fan assembly of FIG. 1.

Referring now to FIGS. 1 and 2, there is shown a fan assembly 10 for use on a work machine, such as a wheel loader (not shown). The fan assembly 10 includes a fan housing 12 which has a central passage 14, a shroud 16, and a grab bar or handle 18 defined therein. The fan assembly 10 includes a number of grille panels 22, a number of motor brackets 24 having a mounting plate 26 secured thereto, and a fan motor 28.

The motor brackets 24 are secured to the fan a housing 12 through a number of bushings 30 (see FIG. 2) positioned in a respective number of holes defined in the fan housing 12. The mounting plate 26 is secured to a mounting flange 32 defined in each of the motor brackets 24. The fan motor 28 is bolted or otherwise secured to the mounting plate 26 with a number of fasteners such as bolts 34. As shown in FIG. 2, the fan motor 28 has a number of fan blades 36 secured thereto. Rotation of the fan blades 36 by the fan motor 28 creates a flow of air which is advanced through a heat exchanger core of a radiator (not shown). The shroud 16 is configured to draw or otherwise direct such a flow of air from the radiator's heat exchanger core to the area outside of the fan assembly 10 (i.e. through the grille panels 22).

It should be appreciated that the fan motor 28 may be any type of rotary motor which is capable of driving or otherwise rotating the fan blades 36. For example, the fan motor 28 may include a known hydraulic motor. Moreover, a number of hydraulic lines (not shown) may be advanced through a hydraulic line access opening 38 defined in the fan housing 12 in order to provide a flow of hydraulic fluid to power the fan motor 28.

The fan housing 12 further includes a number of housing walls 13, 15, 17, 19. The fan walls 13, 15, 17, 19 collectively function as a fan guard 21 of the fan assembly 10. The fan guard 21 prevents inadvertent contact with the fan blades 36 as the fan blades 36 are rotated at the high speeds associated with operation thereof.

The grille panels 22 are secured to the fan housing 12 over the central passage 14 by use of a number of fasteners such as bolts (not shown). The grille panels 22 have a number of air openings 40 defined therein. The air openings 40 allow air to be advanced therethrough, but prevent debris or the like from contacting the rotating fan blades 36.

The fan housing 12 further has a pair of hinge recesses 42 defined therein. Each of the hinge recesses 42 preferably has a first portion of a hinge assembly (not shown) secured therein. A second portion of each of the hinge assemblies is secured to a body portion (not shown) of the work machine thereby allowing the fan housing 12 to pivot or otherwise move relative to the body of the work machine. It should be appreciated that such movement of the fan housing is particularly useful for allowing access to a number of components associated with the work machine (e.g. the fan motor 28) during servicing thereof.

The fan housing also has a number of inner grille recesses 43 defined therein. An inner grille screen (not shown) may be secured within the grille recesses 43. Such an inner grille screen is particularly useful for preventing debris or the like from inadvertently contacting the rotating fan blades 36 from the side of the fan housing 12 opposite of the grille panels 22.

Moreover, the fan housing 12 has a latch recess 44 defined therein. The latch recess 44 preferably has a latch assembly (not shown) secured therein. The latch assembly is provided to selectively secure the fan housing 12 to the body of the work machine. In particular, the latch assembly may be locked so as to prevent the fan housing 12 from pivoting relative to the body of the work machine, or may be unlocked in order to allow the fan housing 12 to pivot relative the body of the work machine.

The fan housing 12 further has a pair of light mounting recesses 46 and an instrument chamber 48 defined therein (see FIG. 1). A number of lamp assemblies (not shown) may be secured to the fan housing 12 within the light mounting recesses 46 in order to provide light during operation of the work machine. Moreover, an audible tone generator or instrument (not shown) is secured within the instrument chamber 48. The tone generator is provided to generate audible tones during operation of the work machine. For example, the tone generator may emit a beeping tone or sound as the work machine is advanced in a reverse direction.

Figure 3:
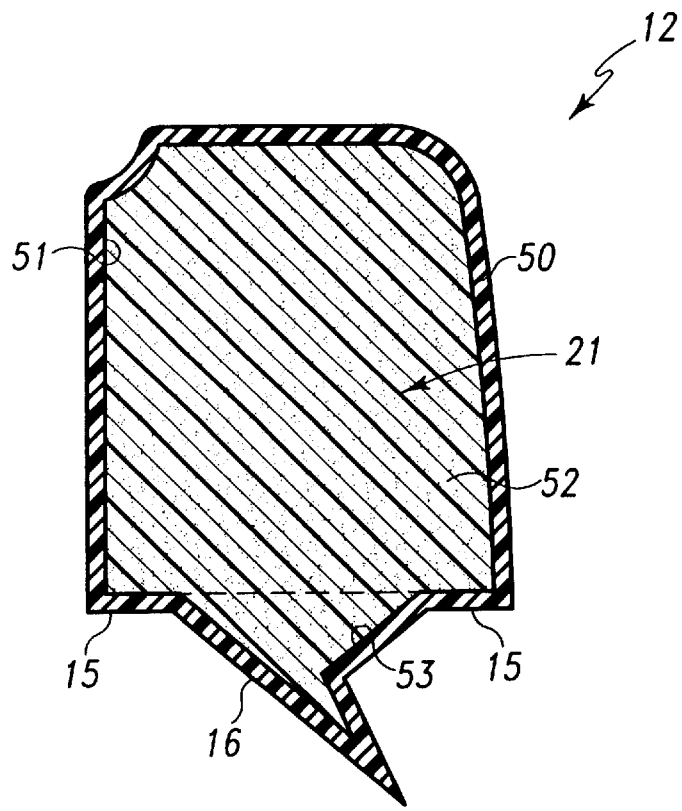
FIG. 3 is a cross sectional view of the fan housing taken along the line 3—3 of FIG. 2, as viewed in the direction of the arrows.

The fan housing 12 is preferably configured as a single, hollow exterior shell structure 50 having an interior filler material 52 disposed therein. The exterior shell structure 50 is preferably constructed of a moldable material, such as known polyolefins. One polyolefin which is suitable for use in the present invention is polyethylene. Moreover, the exterior shell structure 50 may be fabricated using any one of a number of molding processes or techniques. For example, the exterior shell structure 50 may be rotationally molded so as to form a single, hollow, integrated component having a number of voids 51, 53, 55 (see FIGS. 3 and 4) defined therein. In particular, as shown in FIG. 3, the fan guard 21 has the void 51 defined therein, whereas the fan shroud 16 has the void 53 defined therein. Moreover, the handle 18 has the void 55 defined therein. It should be appreciated that since the exterior shell structure 50 is preferably configured as a single, hollow, integrated component, each of the voids 51, 53, 55 are in fluid communication with one another.

As alluded to above, the hollow internal portion of the exterior shell structure 50 is injected or otherwise filled with the filler material 52, such as a polyurethane foam. Use of the filler material 52 allows direct attachment of various components associated with the fan assembly 10 (e.g. the fan motor 28, the latch assembly, the hinge assemblies) to the fan housing 12. In particular, use of the filler material 52 enhances the structural rigidity and stiffness of the fan housing 12 thereby allowing the various components (e.g. the fan motor 28, the latch assembly, the hinge assemblies) to be directly attached to the fan housing 12.

Figure 4:
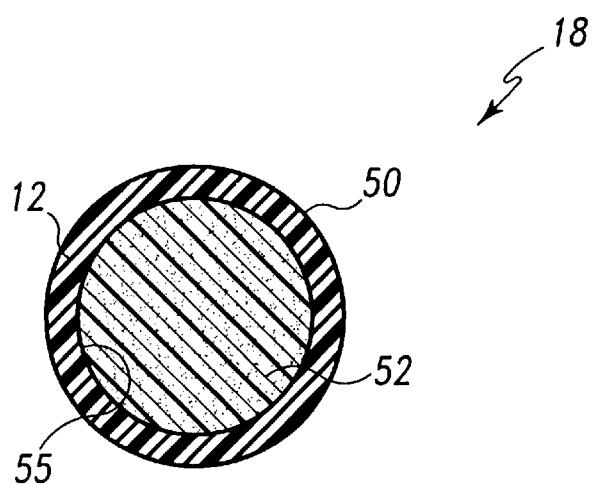
FIG. 4 is a cross sectional view of the fan housing taken along the line 4—4 of FIG. 1, as viewed in the direction of the arrows.

As shown in FIG. 4, complete filling of the fan housing 12 with the filler material 52 causes the hollow, void 55 defined by the handle 18 to also be filled with the filler material 52. Presence of the filler material 52 within the handle 18 provides the structural rigidity necessary to enable use of the handle 18 during servicing of the work machine. In particular, the operator (not shown) of the work machine may grab or otherwise grip the handle 18 when the operator is ascending or descending a ladder (not shown) secured to the side of the work machine.

Similarly, it should further be appreciated that such complete filling of the fan housing 12 with the filler material 52 causes the hollow, voided areas defined by various other components defined in the fan housing 12 to also be filled with the filler material 52. For example, the void 53 defined by the fan shroud 16 has the filler material 52 disposed therein (see FIG. 3). Moreover, the void 51 defined by the fan guard 21 has the filler material 52 disposed therein (see FIG. 3).

INDUSTRIAL APPLICABILITY

Figure 5:
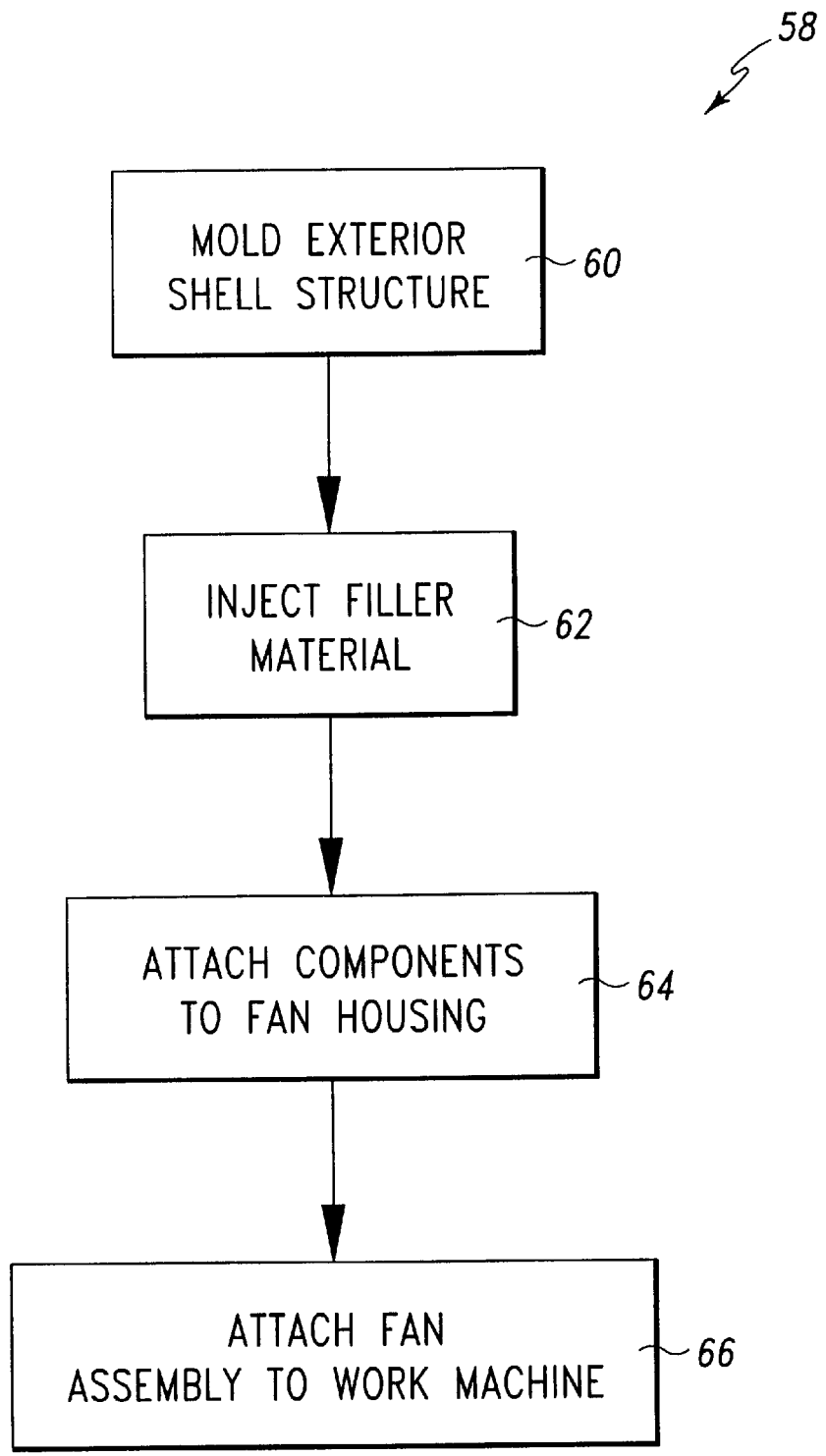
FIG. 5 is a flowchart of a general procedure for manufacturing the fan assembly of FIG. 1.

In operation, the fan assembly 10 may be partially assembled prior to being secured to the work machine. In particular, FIG. 5 is a flowchart which shows a general procedure 58 for manufacturing the fan assembly 10. The first step in the general procedure 58 is step 60 in which the exterior shell structure 50 is molded. In particular, a predetermined quantity of polyethylene is rotationally molded so as to form the exterior shell structure 50. Also in step 60, the bushings 30 are inserted into their respective holes in the exterior shell structure 50.

The next step in the procedure 58 is step 62 in which the exterior shell structure 50 is filled with the filler material 52. In particular, a predetermined quantity of polyurethane is injected or otherwise filled into the hollow, voided areas (e.g. the voids 51, 53, 55) of the exterior shell structure 50. It should be appreciated that such injection of polyurethane enhances the structural rigidity and stiffness associated with the fan housing 12.

The next step in the procedure 58 is step 64 in which a number of the remaining components associated with the fan assembly 10 are secured to the fan housing 12. In particular, the motor brackets 24 may be secured to the fan housing 12 through the bushings 30. Thereafter, the fan motor 28 may be bolted to the mounting plate 26 with the bolts 34. The fan blades 36 may then be secured to the fan motor 28.

Moreover, in step 64 the lamp assemblies (not shown) and the latch assembly (not shown) may be positioned in the light mounting recesses 46, and the latch recess 44, respectively. In addition, the tone generator (not shown) may be secured within the instrument chamber 48. Also in step 64, the grille panels 22 may be bolted to the fan housing 12.

The next step in the procedure 58 is step 66 in which the fan assembly 10 is secured to the work machine (not shown). In particular, the second portion of the hinge assemblies (not shown) is first secured to a body portion of the work machine. Thereafter, the first portion of each of the hinge assemblies (not shown) is secured within the hinge recesses 42 thereby securing the fan housing 12 to work machine. In addition, a number of hydraulic lines (not shown) may be advanced through a hydraulic line access opening 38 defined in the fan housing 12, and thereafter coupled to the fan motor 28 in order to provide a flow of hydraulic fluid thereto. It should be appreciated that lead wires or the like may also be coupled to the lamp assemblies positioned in the light mounting recesses 46 and the tone generator positioned in the instrument chamber 48 so as to provide power thereto.

It should be appreciated that the order in which the various components are secured to the fan housing 12 may be altered or otherwise varied. For example, although a number of components (e.g. the grille panels 22) are described herein as being secured to the fan housing 12 prior to securing the fan housing 12 to the body portion of the work machine (as described above in step 64), such components may alternatively be secured to the fan housing 12 subsequent to securing the fan housing 12 to the body portion of the work machine.

From the above discussion, it should be appreciated that the fan assembly 10 has numerous advantages relative to fan assemblies which have heretofore been designed. For example, by use of a single, integrated fan housing 12 (in lieu of a separate fan guard, fan shroud, etc.), the fan assembly 10 has fewer components relative to fan assemblies which have heretofore been designed thereby reducing costs associated with the work machine. In addition, use of such fewer components also advantageously reduces assembly time associated with the work machine.

Moreover, use of the polyurethane filled polyethylene exterior shell structure 50 advantageously reduces the weight associated with fan assembly 10 relative to fan assemblies which have heretofore been designed. In addition, cosmetic graphics or the like may be molded into the fan housing 12 in lieu of a decal or the like being installed on the outside thereof.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A fan assembly, comprising:
   a fan housing defining a central passage, said fan housing being prepared by a process including the steps of (i) molding an exterior shell structure having a first void therein, and (ii) filing said first void of the exterior shell structure with an interior filler material after the exterior shell structure molding step;
   a fan blade positioned in said central passage; and
   a fan motor for rotating said fan blade, wherein;
   said shell structure molding step includes the step of forming said exterior shell structure from a quantity of polyethylene, and
   said filling step includes the step of inserting a quantity of polyurethane into said first void of said exterior shell structure after said molding step.

2. The fan assembly of claim 1, wherein:
   said fan housing includes a handle attached to said exterior shell structure, and
   said process of preparing said fan housing further includes the steps of (i) molding said handle so as to have a second void therein, and (ii) filling said second void of said handle with said interior filler material after said handle molding step.

3. The fan assembly of claim 1, wherein:
   said fan housing includes a shroud attached to said exterior shell structure, and
   said process of preparing said fan housing further includes the steps of (i) molding said shroud so as to have a third void therein, and (ii) filling said third void of said shroud with said interior filler material after said shroud molding step.

4. The fan assembly of claim 1, further comprising a motor bracket, wherein:
   said motor bracket is attached to said fan housing, and
   said fan motor is attached to said motor bracket.

5. The fan assembly of claim 1, wherein said shell structure molding step includes the steps of (i) forming a latch recess in said fan housing, and (ii) forming a hinge recess in said fan housing.

6. The fan assembly of claim 1, further comprising a panel, wherein:
   said panel includes a plurality of air openings defined therein, and
   said panel is secured to said fan housing over said central passage.

7. The fan assembly of claim 1, wherein said shell structure molding step further includes the step of forming an instrument chamber in said fan housing.

8. The fan assembly of claim 1, wherein said shell structure molding step includes the step of forming a light mounting recess in said fan housing.

9. The fan assembly of claim 1, wherein said shell structure molding step includes the step of forming a hydraulic line access opening in said fan housing.

10. A fan assembly, comprising:
    a fan housing defining a central passage, said fan housing being prepared by a process which includes the steps of (i) molding the fan housing so as to possess (A) an exterior shell structure having a first void defined therein, (B) a handle having a second void defined therein, said handle being attached to said exterior shell structure, and (C) a shroud having a third void defined therein, said shroud being attached to said exterior shell structure, and (ii) filling said first void, said second void, and said third void with an interior filler material after said molding step;
    a fan blade positioned in said central passage; and
    a fan motor for rotating said fan blade.

11. The fan assembly of claim 10, further comprising a motor bracket, wherein:
    said motor bracket is attached to said fan housing, and
    said fan motor is attached to said motor bracket.

12. The fan assembly of claim 10, wherein said molding step includes the steps of (i) forming a latch recess in said fan housing, and (ii) forming a hinge recess in said fan housing.

13. The fan assembly of claim 10, further comprising a panel, wherein:

said panel includes a plurality of air openings defined therein, and said panel is secured to said fan housing over said central passage.

14. The fan assembly of claim 10, wherein said shell structure molding step further includes the steps of (i) forming an instrument chamber in said fan housing, (ii) forming a light mounting recess in said fan housing, and (iii) forming a hydraulic line access opening in said fan housing.

15. The fan assembly of claim 10, wherein:

said shell structure molding step includes the step of forming said exterior shell structure from a quantity of polyethylene, and said filling step includes the step of inserting a quantity of polyurethane into said first void of said exterior shell structure after said molding step.

16. A fan assembly, comprising:

a fan housing defining a central passage, said fan housing being prepared by a process which includes the steps of (i) molding the fan housing so as to possess (A) an exterior shell structure having a first void defined therein, (B) a handle having a second void defined therein, said handle being attached to said exterior shell structure, (C) a shroud having a third void defined therein, said shroud being attached to said exterior shell structure, (D) a latch recess in said exterior shell structure, (E) a hinge recess in said exterior shell structure, (F) a light mounting recess in said exterior shell structure, (G) a hydraulic line access opening in said exterior shell structure, and (ii) filling said first void, said second void, and said third void with an interior filler material after said molding step.

17. The fan assembly of claim 16, further comprising a motor bracket, wherein:

said motor bracket is attached to said fan housing, and said fan motor is attached to said motor bracket.

18. The fan assembly of claim 16, wherein:

said shell structure molding step includes the step of forming said exterior shell structure from a quantity of polyethylene, and said filling step includes the step of inserting a quantity of polyurethane into said first void of said exterior shell structure after said molding step.

* * * * *